Nov. 27, 1928.

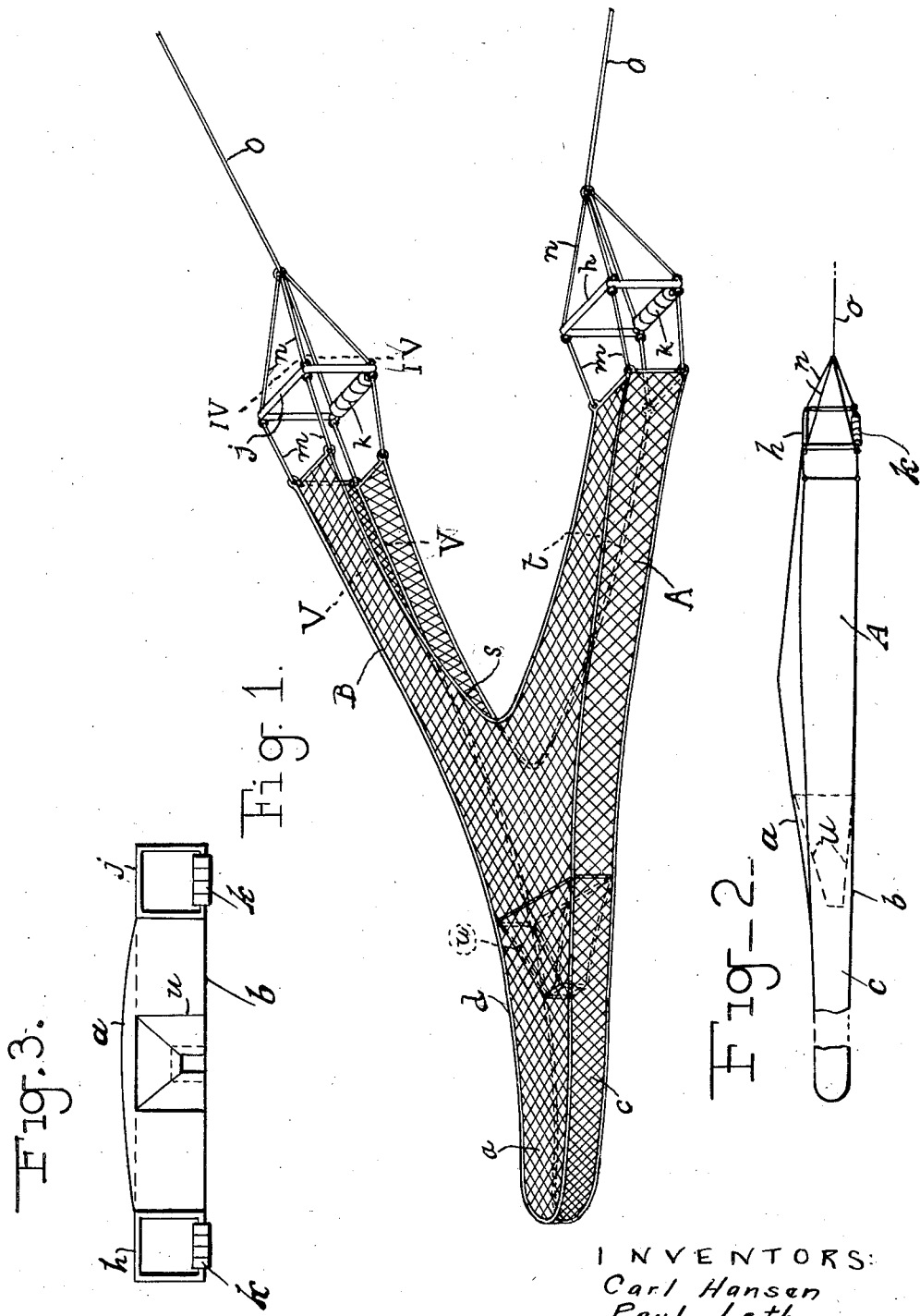

C. HANSEN ET AL 1,692,830

COMBINED SEINE NET AND BOTTOM DRAG NET WITH TRAPPING WINGS

Filed Dec. 2, 1926     2 Sheets-Sheet 2

INVENTORS:
Carl Hansen
Paul Leth
BY: Leege, Boyce & Bakeler
ATTORNEYS.

Patented Nov. 27, 1928.

1,692,830

UNITED STATES PATENT OFFICE.

CARL HANSEN, OF ESBJERG, AND PAUL LETH, OF COPENHAGEN, DENMARK; SAID LETH ASSIGNOR TO SAID HANSEN.

COMBINED SEINE NET AND BOTTOM DRAGNET WITH TRAPPING WINGS.

Application filed December 2, 1926. Serial No 152,129, and in Denmark December 3, 1925.

The invention consists of a combined seine net and bottom drag-net with trapping wings.

In accordance with the invention the top and bottom faces of the trapping wings are continued to the front ends of the trapping wings, the free end of each of the said trapping wings being connected to its corresponding suitably quadrilateral stretching frame in such manner that the trapping wings, while being maintained securely stretched to the proper U-shape by means of the stretching frames, offer the maximum possible security that the fish, enclosed between the trapping wings, will be guided into the net.

Figure 4:
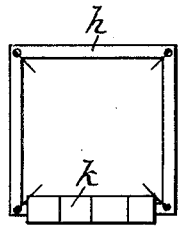
Figure 5:
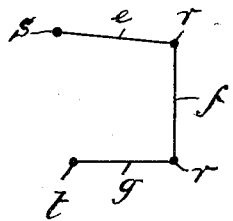
Figure 6:
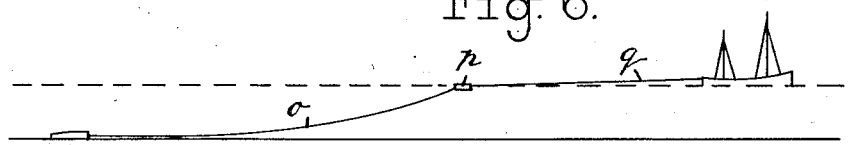
Figure 7:
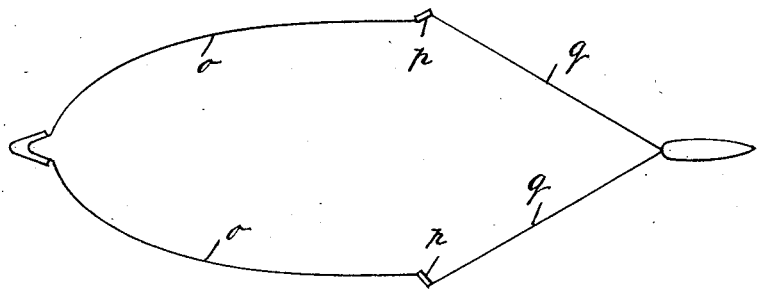

In the accompanying drawing illustrative of the invention, Fig. 1 is a perspective view of the net in its operating position as a dragnet, Figs. 2 and 3 are a side elevation and a front elevation, respectively, Figs. 4 and 5, respectively, show sections along the lines IV—IV and V—V in Fig. 1, and Figs. 6 and 7, respectively, show the net being operated by a boat, in side elevation and plan, respectively, Figs. 2 to 7 being more or less diagrammatic.

The net proper is composed of four net faces, namely a top face $a$, a bottom face $b$ and two side faces $c$ and $d$, which are shaped in such a manner that the net when stretched will be of pyramid like shape. Inside the net there is provided a valve $u$ preventing the fish after entry from leaving the net. The valve is formed by four net faces adjusted in such a manner that the valve becomes shaped like a truncated pyramid. Along each of the contiguous edges of these net faces there is provided a line to which the edges are attached. The forward end edges of the valve fit against and are attached to the corresponding faces of the net proper, and the front ends of the edge cords of the valve are also attached to the net, in such manner that the latter forms one body with the valve. The edge cords may be extended beyond the open rear end of the valve, and the ends may be attached to the net proper without, however, being stretched.

A and B are the trapping wings formed each by extensions of the side faces and the adjacent portions of the top and bottom face, in such manner that each of the trapping wings will be channel-shaped with a top face $e$, a side face $f$ and a bottom face $g$, see Fig. 5. Along the joint between each of the edges of the side faces and the edges of the top and bottom face there is attached a cord $r$, which cords are extended along the corresponding edges of the net proper, $s$ is the top leach of the net and $t$ the bottom leach, which are attached along the forwardly directed edges of the top and bottom, respectively. Glass balls, cork floats, or the like may be attached to the top leach and sinkers may be attached to the bottom leach. The top face $a$ of the net is slightly longer than the bottom face $b$ of the same, in order that during fishing it will project forward beyond the bottom leach. The top and bottom faces $e$ and $g$ respectively of each of the trapping wings are continued to the front ends of the trapping wings A and B and are connected to suitably quadrilateral frames $h$ and $j$, respectively, the top and side pieces of which are tubular, while the bottom piece is a solid rod fitted with a number of rolls $k$. Each of the frames $h$ and $j$ is connected by means of four cords $m$, viz, one from each corner, to the corresponding corners of the faces of the trapping wings, in such manner that the front ends of the trapping wings will be spread out by means of the frames. To each of the latter there is attached a hook or an eye to which the dragline $o$ is attached. The front end of each of the drag-lines is attached to its corresponding otter board $p$. Figs. 6 and 7, to which the rear end of a drag-line $q$ from the ship is also connected.

During the fishing operation the otter boards $p$, which during the forward motion of the ship and owing to their construction are forced up to the water surface and follow the latter, will move the lines $q$ obliquely out on either side of the ship, and the drag lines will occupy about the position shown in Figs. 6 and 7, in which position they limit a space of suitable length and width. During the forward motion the otter boards $p$ and the lines $o$ guide the fish from the said space towards the net, and the trapping wings of the latter assist, by their channel shaped construction, to direct the fish into the net proper, as the fish when within the limits of the trapping wings try for instance to escape upward they will strike the face $e$ and therefore, will at once be directed downward. During the forward motion the frames $h$ and $j$ and the cords $r$ will assist in holding the trapping wings and the net proper stretched, and each of the cords $r$ will tend to maintain an approximately rectilinear position, in such manner that the side faces of the net will also become nearly rectilinear. The top leach *s* will become curved slightly upward, in such manner that the upper face *a* of the net will be slightly arched. The preservation of this stretched form of the net in use, which is due as mentioned above partly to the frames *h* and *j* and partly to the cords *r*, is advantageous in several ways. Suffocation or injury to the fish caught in the net will thus be avoided, and the net may more easily be drawn forward, partly because the rolls *k* on the frames *h* and *j* run along the bottom of the sea, partly because the fish may move about relatively unobstructed inside the net. By the provision of the trapping arms the fishing area will be increased, without the net being enlarged, and the possibility of a large catch is greater than with the use of trawls as hitherto constructed.

Another advantage of the herein described net construction is that maintenance of the net becomes cheaper, as it is not necessary to throw away the entire net when the latter is partly worn out or damaged, but a single one of the net faces may be renewed when worn.

The net may be used as a seine-net when turned upside down. It is then merely necessary to move the sinkers from the bottom leach *t* to the top leach *s*, and the glass balls, cork floats or the like from the latter to the bottom leach, and to replace the frames *h* and *j* by other ones suited for the purpose. The net may also be adapted for use for fishing at intermediate depths, partly by shortening or lengthening the lines and partly by increasing or reducing the loading of the bottom leach and the frames on the trapping wings.

Having thus described our invention, what we claim is:—

1. A combined seine and drag-net, comprising a net proper, trapping wings extending forward from said net and each having a top portion, a bottom portion and a side portion, and a stretching frame secured to the forward end of each of said trapping wings and adapted to maintain the wings approximately channel-shaped in cross section.

2. A combined seine and drag-net, comprising a net proper having an open mouth at one end, trapping wings extending forward from said net, and a rectangular stretching frame secured to the forward end of each of said trapping wings and adapted to maintain the wings approximately channel-shaped in cross section, the open sides of said channel-shaped wings merging into the mouth of the net.

3. A combined seine and drag-net, comprising a net proper of comparatively narrow width at its rear end and of considerably greater width at its opposite end, the wide end being bifurcated to form a channel-shaped member at each side extending beyond the net proper, and a stretching frame secured to the forward end of each of said channel-shaped members thereby to maintain the same in channel-forming condition.

In testimony whereof we have signed our names to this specification.

CARL HANSEN.
PAUL LETH.